United States Patent
Kawanoue

(10) Patent No.: US 10,591,886 B2
(45) Date of Patent: Mar. 17, 2020

(54) CONTROL SYSTEM, CONTROL PROGRAM, AND CONTROL METHOD FOR DEVICE SWITCHING RESPONSIVE TO ABNORMALITY DETECTION

(71) Applicant: OMRON Corporation, Kyoto-shi, Kyoto (JP)

(72) Inventor: Shinsuke Kawanoue, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 207 days.

(21) Appl. No.: 15/784,959

(22) Filed: Oct. 16, 2017

(65) Prior Publication Data
US 2018/0164768 A1    Jun. 14, 2018

(30) Foreign Application Priority Data

Dec. 14, 2016  (JP) .................................. 2016-242304

(51) Int. Cl.
*G06F 11/00* (2006.01)
*G05B 19/05* (2006.01)
(Continued)

(52) U.S. Cl.
CPC ....... *G05B 19/054* (2013.01); *G05B 13/0265* (2013.01); *G05B 19/058* (2013.01);
(Continued)

(58) Field of Classification Search
CPC .... G06F 11/2035; G06F 11/20; G06F 11/202; G06F 11/2033
See application file for complete search history.

(56) References Cited

U.S. PATENT DOCUMENTS

2003/0004688 A1*  1/2003  Gupta ................... G06F 21/55
                                                        702/188
2009/0140745 A1*  6/2009  Williams ............ G01R 31/2829
                                                        324/522
(Continued)

FOREIGN PATENT DOCUMENTS

EP       2685335 A2      1/2014
JP       2015-133002 A   7/2015

OTHER PUBLICATIONS

Carl Waldspurger et al, I/O Virtualization, Communications of the ACM, vol. 55, No. 1, Jan. 1, 2012, p. 66, relevance is indicated in the EESR dated May 23, 2018 in a counterpart European patent application.
(Continued)

*Primary Examiner* — Christopher S McCarthy
(74) *Attorney, Agent, or Firm* — Metrolex IP Law Group, PLLC

(57) ABSTRACT

A control system includes a controller for controlling a control target and redundant devices accessible from the controller. The control system includes a feature quantity generation unit that generates a feature quantity from data associated with the redundant devices, an abnormality detection unit that determines whether an abnormality has occurred in one of the redundant devices based on the feature quantity generated by the feature quantity generation unit and a predetermined abnormality detection parameter, a switch unit that switches the redundant devices between a working mode and a standby mode when the abnormality detection unit determines that an abnormality has occurred, and a learning unit that performs machine learning using the data associated with the redundant devices to determine the abnormality detection parameter.

20 Claims, 11 Drawing Sheets

(51) Int. Cl.
*G05B 13/02* (2006.01)
*G05B 23/02* (2006.01)
*G05B 19/042* (2006.01)

(52) U.S. Cl.
CPC ..... *G05B 23/0289* (2013.01); *G05B 23/0294* (2013.01); *G05B 19/0428* (2013.01); *G05B 23/0237* (2013.01); *G05B 2219/14014* (2013.01); *G05B 2219/14037* (2013.01)

(56) References Cited

U.S. PATENT DOCUMENTS

| | | | |
|---|---|---|---|
| 2014/0239923 A1 | 8/2014 | Alley | |
| 2015/0199245 A1 | 7/2015 | Goto et al. | |
| 2015/0241523 A1* | 8/2015 | Scherr | G01R 33/0023 324/244 |
| 2016/0033941 A1* | 2/2016 | T | G06F 8/65 700/81 |
| 2016/0378153 A1* | 12/2016 | Kelly | G06F 1/266 710/313 |
| 2017/0297402 A1* | 10/2017 | Chen | B60T 8/17551 |

OTHER PUBLICATIONS

Extended European search report (EESR) dated May 23, 2018 in a counterpart European application.

* cited by examiner

FIG. 7

| Target data | Area | Change in behavior | | Feature quantity name |
|---|---|---|---|---|
| Single data piece | Time area | Change in median value | Average / Median value | Median value |
| Single data piece | Time area | Change in difference | x − y | Difference |
| Single/multiple data piece(s) | Time area | Change in ratio | x/y | Ratio |
| Single/multiple data piece(s) | Time area | Change in duty ratio | | Duty ratio |
| Single data piece | Time area | Change in maximum value | | Maximum value |
| Single data piece | Time area | Change in minimum value | | Minimum value |
| Multiple data pieces | Time area | Greater shift in synchronization (multiaxial) | | Synchronization shift (multiaxial)_pulse |
| | | Greater shift in synchronization (biaxial) | | Synchronization shift (biaxial)_periodicity |
| Multiple data pieces | Time area | Change in correlation value | | Correlation value |
| Multiple data pieces | Time area | Change in Mahalanobis' distance | | Mahalanobis' distance |
| Multiple data pieces | Time area | Change in jackknife distance | $J_i = \sqrt{\frac{(n-1)n^2}{(n-1)n^3} \times \frac{M_i^2}{1 - \frac{M_i}{(n-1)n^2}}}$ | Jackknife distance |
| Single data piece | Time area | Change in quartile | | Quartile |
| Single data piece | Time area | Wider variation in period | | Period variation |

FIG. 8

| Device type | Feature quantity generation technique | Abnormality detection technique |
|---|---|---|
| Digital I/O unit | Amplitude variation in each digital I/O signal | Upper and lower limit |
| Analog I/O unit | Distortion degree in each analog I/O signal | Upper limit |
| ⋮ | ⋮ | ⋮ |

CONTROL SYSTEM, CONTROL PROGRAM, AND CONTROL METHOD FOR DEVICE SWITCHING RESPONSIVE TO ABNORMALITY DETECTION

CROSS REFERENCE TO RELATED APPLICATIONS

This application claims priority from prior Japanese Patent Application No. 2016-242304 filed with the Japan Patent Office on Dec. 14, 2016, the entire contents of which are incorporated herein by reference.

FIELD

The present disclosure relates to a control system, a control program, and a control method for automatically switching redundant devices.

BACKGROUND

Factory automation (FA) technology involving controllers, such as programmable logic controllers (PLCs), is widely used at various production sites. A potential need for such controllers is to increase capacity utilization and maintainability by reducing the equipment downtime and maintenance time. Japanese Unexamined Patent Application Publication No. 2015-133002 (Patent Literature 1) describes, for example, an instrumentation system that prevents a decrease in capacity utilization and maintainability in a system including a non-redundant multipoint I/O module. More specifically, Patent Literature 1 describes a host control device that operates a non-redundant I/O module in a pseudo-redundant manner. When the I/O module is to be replaced, the host control device transfers control to a new I/O module.

PATENT LITERATURE

Patent Literature 1: Japanese Unexamined Patent Application Publication No. 2015-133002

SUMMARY

Technical Problem

Although the system described in Patent Literature 1 may be suited to breakdown maintenance (BM) in which the I/O module is replaced after a machine failure occurs, many production sites actually use preventive maintenance (PM), in which target parts are replaced or fixed before failures occur. PM can reduce sudden equipment stops caused by failures and can thus avoid the resultant lower capacity utilization.

However, PM involves monitoring of the operating status and the operating time. This increases the cost for maintenance operations.

One or more aspects are directed to a technique for increasing the equipment capacity utilization and reliability while reducing the maintenance cost.

Solution to Problem

One aspect provides a control system including a controller for controlling a control target and redundant devices accessible from the controller. The control system includes a feature quantity generation unit that generates a feature quantity from data associated with the redundant devices, an abnormality detection unit that determines whether an abnormality has occurred in one of the redundant devices based on the feature quantity generated by the feature quantity generation unit and a predetermined abnormality detection parameter, a switch unit that switches the redundant devices between a working mode and a standby mode when the abnormality detection unit determines that an abnormality has occurred, and a learning unit that performs machine learning using the data associated with the redundant devices to determine the abnormality detection parameter.

In some embodiments, the switch unit includes a storage unit that stores real device configuration information indicating a real configuration of each of the redundant devices and virtual device configuration information indicating a virtualized configuration of each of the redundant devices. The virtual device configuration information includes information about a device to newly function as a working device. The switch unit further includes an update unit that updates the information about the device to newly function as a working device contained in the virtual device configuration information when the abnormality detection unit determines that an abnormality has occurred.

In some embodiments, the control system further includes a variable manager that transmits and receives data to and from a target device by referring to a virtual device address. The switch unit associates the virtual device address with an address of the device to newly function as a working device when the abnormality detection unit determines that an abnormality has occurred.

In some embodiments, the switch unit instructs one of the redundant devices functioning as a working device to switch to a standby device, and instructs one of the redundant devices functioning as a standby device to switch to a working device when the abnormality detection unit determines that an abnormality has occurred.

In some embodiments, the abnormality detection parameter is determined in accordance with a feature quantity that is a sign of a failure in one of the redundant devices.

In some embodiments, the control system further includes a log output unit that outputs, when the abnormality detection unit determines that an abnormality has occurred, an event log including information about the abnormality.

In some embodiments, at least one of a plurality of techniques each predefined for generating the feature quantity is selected.

In some embodiments, the redundant devices each include at least one member selected from the group consisting of a digital input/output unit, an analog input/output unit, a servo driver, an inverter unit, an image sensor, a displacement sensor, and a fiber sensor.

Another aspect provides a control program executable by a computer to implement a controller for controlling a control target. The program enables the computer to implement generating a feature quantity from data associated with redundant devices accessible from the controller, determining whether an abnormality has occurred in one of the redundant devices based on the generated feature quantity and a predetermined abnormality detection parameter, switching the redundant devices between a working mode and a standby mode when an abnormality is determined to have occurred, and performing machine learning using the data associated with the redundant devices to determine the abnormality detection parameter.

A further aspect provides a control method used by a controller for controlling a control target. The method includes generating a feature quantity from data associated with redundant devices accessible from the controller, determining whether an abnormality has occurred in one of the redundant devices based on the generated feature quantity and a predetermined abnormality detection parameter, switching the redundant devices between a working mode and a standby mode when an abnormality is determined to have occurred, and performing machine learning using the data associated with the redundant devices to determine the abnormality detection parameter.

Advantageous Effects

The technique according to one or more aspects may increase the equipment capacity utilization and reliability while reducing the maintenance cost.

BRIEF DESCRIPTION OF THE DRAWINGS

FIG. 7 is a table illustrating the feature quantities that can be determined in a preparation process performed in a control system according to one or more embodiments.

FIG. 8 is a schematic diagram illustrating example abnormality detection techniques or example abnormality detection parameters determined in a preparation process in a control system according to one or more embodiments.

DETAILED DESCRIPTION

Figure 1:
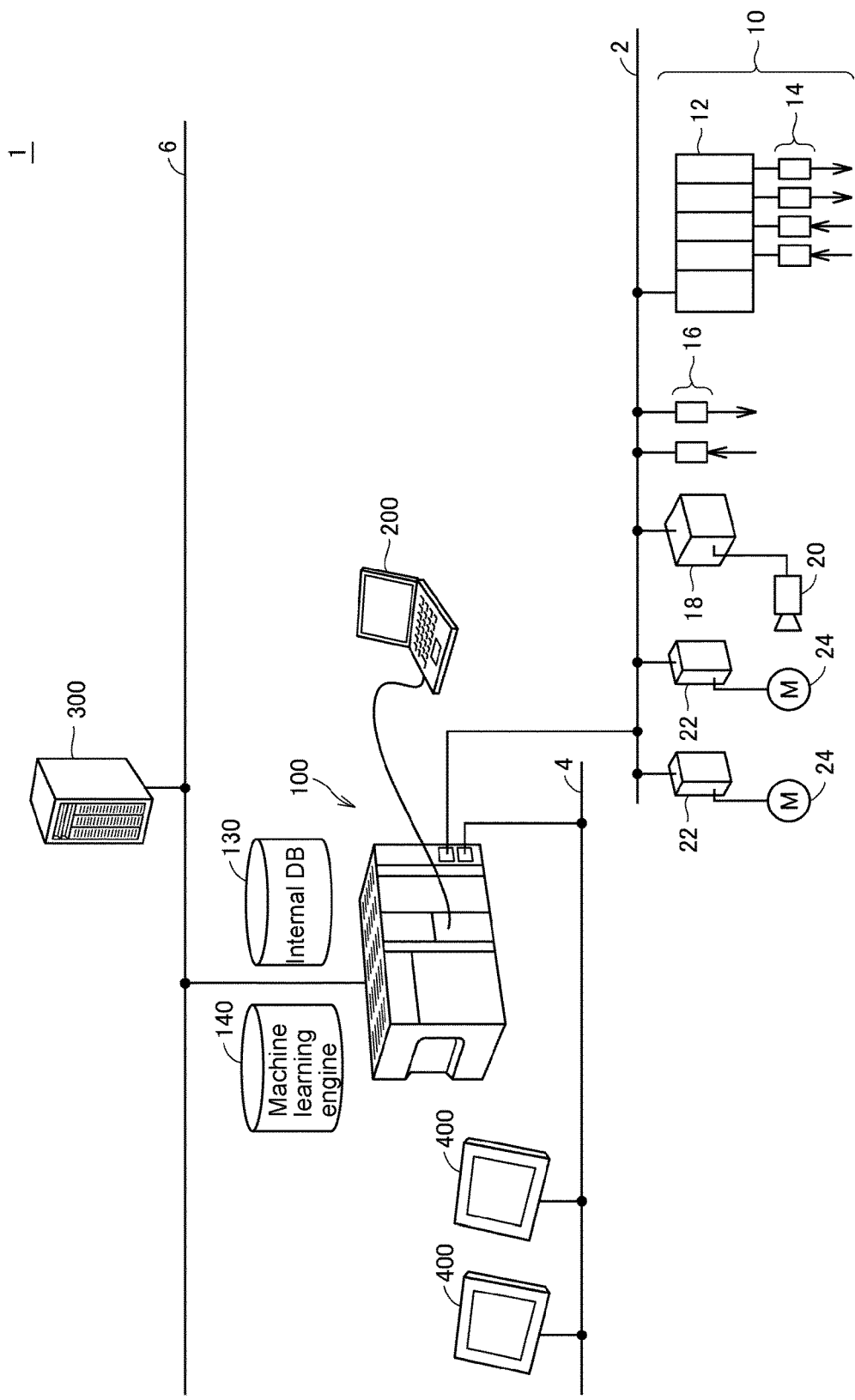
FIG. 1 is a schematic diagram illustrating the overall configuration of a control system according to one or more embodiments.

Embodiments will now be described with reference to the drawings. The same or corresponding components in the figures are given the same reference numerals, and will not be described repeatedly.

A. Overall Configuration of Control System

The overall configuration of the control system 1 including a controller according to one or more embodiments will now be described.

FIG. 1 is a schematic diagram showing the overall configuration of the control system 1 according to an embodiment. As shown in FIG. 1, the control system 1 according to an embodiment includes a controller 100 for controlling a control target, and a support apparatus 200 connected to the controller 100 as its main components.

The controller 100 may be a computer such as a programmable logic controller (PLC). The controller 100 is connected to a field device group 10 with a first field network 2 and to one or more displays 400 with a second field network 4. The controller 100 is also connected to a data logging device 300 with a local network 6. The controller 100 transmits and receives data to and from each connected device using the corresponding network. The data logging device 300 and the displays 400 are optional and not essential in the control system 1.

The controller 100 includes a control logic (or a PLC engine) that performs various computations for controlling equipment and machines. In addition to the PLC engine, the controller 100 includes a component that provides a data collection function, or collecting data obtained by the field device group 10 and transferred to the controller 100 (hereafter, input data), and further a component that provides a monitoring function, or monitoring the collected input data.

More specifically, the controller 100 includes an internal database (DB) 130 that provides the data collection function, and a machine learning engine 140 that provides the monitoring function. The internal DB 130 and the machine learning engine 140 will be described in detail later.

The first field network 2 and the second field network 4 may be networks that allow fixed-cycle communication that assures data arrival times. Examples of such networks allowing fixed-cycle communication include EtherCAT (registered trademark), EtherNet/IP (registered trademark), DeviceNet (registered trademark), CompoNet (registered trademark).

The field device group 10 includes devices for collecting input data from a control target or a manufacturing apparatus and a production line associated with control (hereafter collectively referred as a field). The devices for collecting input data may include an input relay and various sensors. The field device group 10 also includes devices for acting on the field in a certain manner in response to a command (or output data) provided from the controller 100. The devices for acting on the field may include an output relay, a contactor, a servo driver, a servo motor, and any actuator. The field device group 10 transmits and receives data including input data and output data to and from the controller 100 through the first field network 2.

In the configuration shown in FIG. 1, the field device group 10 includes a remote input/output (I/O) device 12, a relay group 14, an image sensor 18 with a camera 20, and servo drivers 22 each with a servomotor 24.

The remote I/O device 12 includes a communication unit that allows communication with the first field network 2, and an input and output (I/O) unit for obtaining input data and outputting output data. The I/O unit allows communication of input data and output data between the controller 100 and the field. In the example of FIG. 1, digital signals are transmitted and received as input data and output data through the relay group 14.

The I/O unit may be directly connected to the field network. In the example shown in FIG. 1, I/O units 16 are directly connected to the first field network 2.

The image sensor 18 performs image measurement such as pattern matching on image data obtained by the camera 20, and transmits the measurement results to the controller 100.

The servo driver 22 drives the servomotor 24 in accordance with output data (e.g., a position command) from the controller 100.

The data transmitted and received between the controller 100 and the field device group 10 with the first field network 2 as described above is updated in short periods of the orders of hundreds of microseconds to tens of milliseconds. The update process for such transmitted and received data may be referred to as I/O refresh.

The display 400 connected to the controller 100 with the second field network 4 receives a user operation, and transmits a command corresponding to the user operation to the controller 100. The display 400 also graphically shows the computation results obtained from the controller 100.

The data logging device 300 is connected to the controller 100 with the local network 6, and transmits and receives intended data to and from the controller 100. The data logging device 300 has, for example, a database function, and chronologically collects event logs created by the controller 100. The local network 6 may have a general-purpose protocol, such as Ethernet (registered trademark). Typically, the local network 6 may use a data transmission cycle or a data update cycle longer than the data transmission cycle or the data update cycle used in the field networks (the first field network 2 and the second field network 4). However, the local network 6 may allow transmission of more data at a time than the field networks.

The support apparatus 200 supports the preparations of the controller 100 for controlling a control target. More specifically, the support apparatus 200 provides, for example, a development environment (including a programming and program editing tool, a parser, and a compiler) for programs to be executed in the controller 100, a setting environment for setting the parameters (configurations) of the controller 100 and various devices connected to the controller 100, the function of transmitting a generated user program to the controller 100, and the function of online correction and modification of a user program and other data to be executed on the controller 100.

Additionally, the support apparatus 200 according to an embodiment has the setting functions for the internal DB 130 and the machine learning engine 140 implemented in the controller 100. The functions will be described later.

B. Hardware Configurations of Apparatuses

The hardware configurations of the main apparatuses included in the control system 1 according to an embodiment will now be described.

b1: Hardware Configuration of Controller 100

Figure 2:
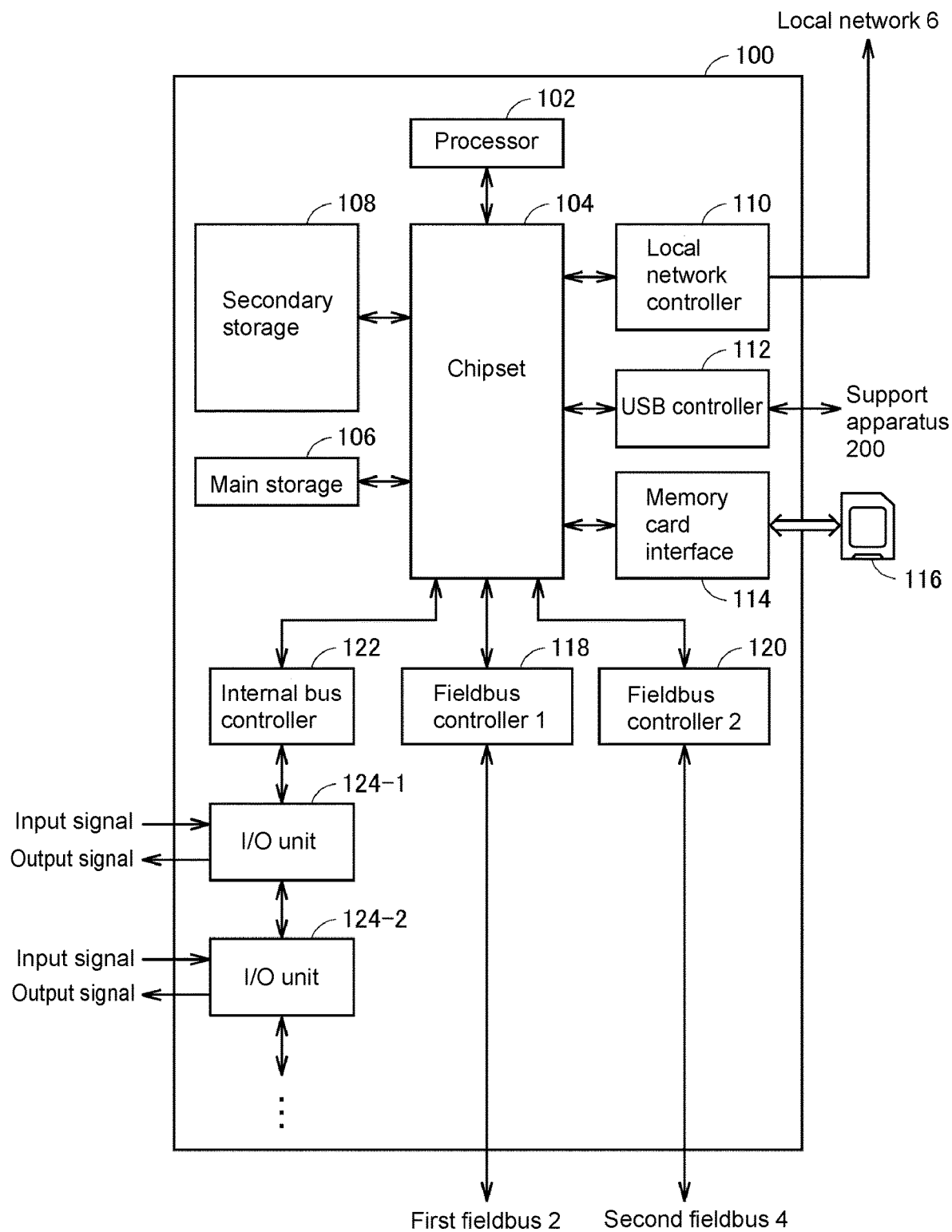
FIG. 2 is a block diagram illustrating the hardware configuration of a controller included in a control system according to one or more embodiments.

FIG. 2 is a block diagram showing the hardware configuration of the controller 100 included in the control system 1 according to an embodiment. As shown in FIG. 2, the controller 100 includes a processor 102, such as a central processing unit (CPU) or a micro-processing unit (MPU), a chipset 104, a main storage 106, a secondary storage 108, a local network controller 110, a universal serial bus (USB) controller 112, a memory card interface 114, an internal bus controller 122, fieldbus controllers 118 and 120, and I/O units 124-1, 124-2, and subsequent I/O units.

The processor 102 reads various programs stored in the secondary storage 108, and expands the programs in the main storage 106 and executes the programs to implement control for the control target and various types of processing described later. The chipset 104 controls the processor 102 and each device to implement the overall processing performed by the controller 100.

The secondary storage 108 stores system programs for implementing the PLC engine as well as user programs executed using the PLC engine. The secondary storage 108 also stores programs for implementing the internal DB 130 and the machine learning engine 140.

The local network controller 110 controls data communication with other devices through the local network 6. The USB controller 112 controls data communication with the support apparatus 200 through USB connection.

The memory card interface 114 can receive a removable memory card 116. The memory card interface 114 allows data to be written to the memory card 116, and various data (e.g., user programs and trace data) to be read from the memory card 116.

The internal bus controller 122 is an interface that allows data communication with the I/O units 124-1, 124-2, and other I/O units incorporated in the controller 100.

The fieldbus controller 118 controls data communication with another device through the first field network 2. Similarly, the fieldbus controller 120 controls data communication with another device through the second field network 4.

Although FIG. 2 shows the configuration in which program execution by the processor 102 provides each intended function, some or all of these functions may also be implemented with dedicated hardware circuits (e.g., application-specific integrated circuits or ASICs, or field-programmable gate array or FPGAs). In some embodiments, the main part of the controller 100 may be implemented with hardware having a general-purpose architecture (e.g., an industrial personal computer based on a general-purpose personal computer). In that case, multiple operating systems (OSes) for different uses may be executed in parallel using a virtualization technique, and an intended application may be executed on each OS.

b2: Hardware Configuration of Support Apparatus 200

The support apparatus 200 according to an embodiment is implemented by, for example, executing programs on hardware having a general-purpose architecture (e.g., a general-purpose personal computer).

Figure 3:
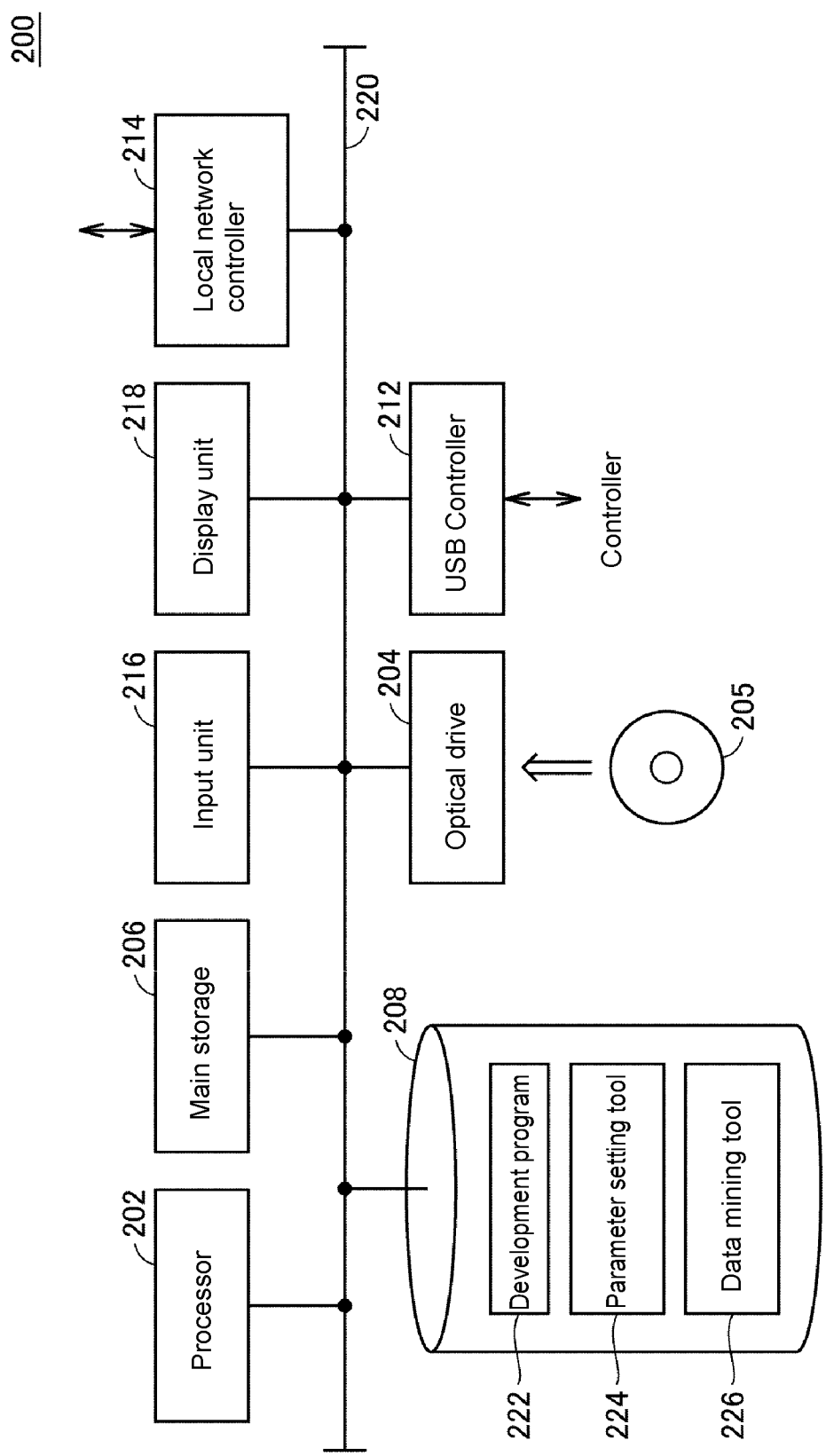
FIG. 3 is a block diagram illustrating the hardware configuration of a support apparatus included in a control system according to one or more embodiments.

FIG. 3 is a block diagram showing the hardware configuration of the support apparatus 200 included in the control system 1 according to an embodiment. As shown in FIG. 3, the support apparatus 200 includes a processor 202, such as a CPU or an MPU, an optical drive 204, a main storage 206, a secondary storage 208, a USB controller 212, a local network controller 214, an input unit 216, and a display unit 218. These devices are connected to one another with a bus 220.

The processor 202 reads various programs stored in the secondary storage 208, expands the programs in the main storage 206 and executes the programs to implement various types of processing described later.

The secondary storage 208 is, for example, a hard disk drive (HDD) or a flash solid state drive (SSD). The secondary storage 208 typically stores a development program 222 for creating a user program to be executed in the support apparatus 200, debugging the created program, defining the system configuration, and setting various parameters, a parameter setting tool 224 for specifying variables for machine learning, and a data mining tool 226 for extracting intended information from the data collected by the controller 100. The secondary storage 208 may store an OS and other programs as appropriate.

The optical drive 204 included in the support apparatus 200 reads a program from a computer-readable recording medium 205 (e.g., an optical recording medium such as a digital versatile disc, or a DVD) in which programs are stored in a non-transitory manner. The read program is installed in, for example, the secondary storage 208.

Various programs executed in the support apparatus 200 may be installed from the computer-readable recording medium 205 or may be downloaded from a server on a network and installed. The function provided by the support apparatus 200 according to an embodiment may be implemented using a part of a module provided by the OS.

The USB controller 212 controls data communication with the controller 100 through USB connection. The local network controller 214 controls data communication with another device through any network.

The input unit 216 includes a keyboard and a mouse, and receives a user operation. The display unit 218 includes a display, various indicators, and a printer, and outputs the processing results from the processor 202 and other information.

Although FIG. 3 shows the configuration in which program execution by the processor 202 provides each intended function, some or all of these functions may also be implemented with dedicated hardware circuits (e.g., ASICs or FPGAs).

b3: Hardware Configuration of Data Logging Device 300

The data logging device 300 included in the control system 1 according to an embodiment may be, for example, a general-purpose file server or a general-purpose database server. The hardware configuration of the device is known, and will not be described in detail.

b4: Hardware Configuration of Display 400

The display 400 included in the control system 1 according to an embodiment is a human-machine interface (HMI) device. The display 400 may have a dedicated configuration or may be implemented with hardware having a general-purpose architecture (e.g., an industrial personal computer based on a general-purpose personal computer).

C. Automatic Device Switching Function Provided by Control System

The automatic device switching function provided by the control system 1 according to an embodiment will now be described.

A device herein refers to any component that can be redundant in the control system 1. Examples of such devices include functional units, sensors, and actuators connected to the controller 100, such as I/O units shown in FIG. 1. More specifically, a device herein refers to any duplexed or multiplexed component included in the control system 1. Typically, a device can serve as a source of input data transmitted to the controller 100 and/or as a destination of output data from the controller 100.

More specifically, examples of such devices further include a digital I/O unit, an analog I/O unit, a servo driver, an inverter unit, an image sensor, a displacement sensor, and a fiber sensor. A redundant device herein may be any of the units, drivers, and sensors listed above.

Figure 4:
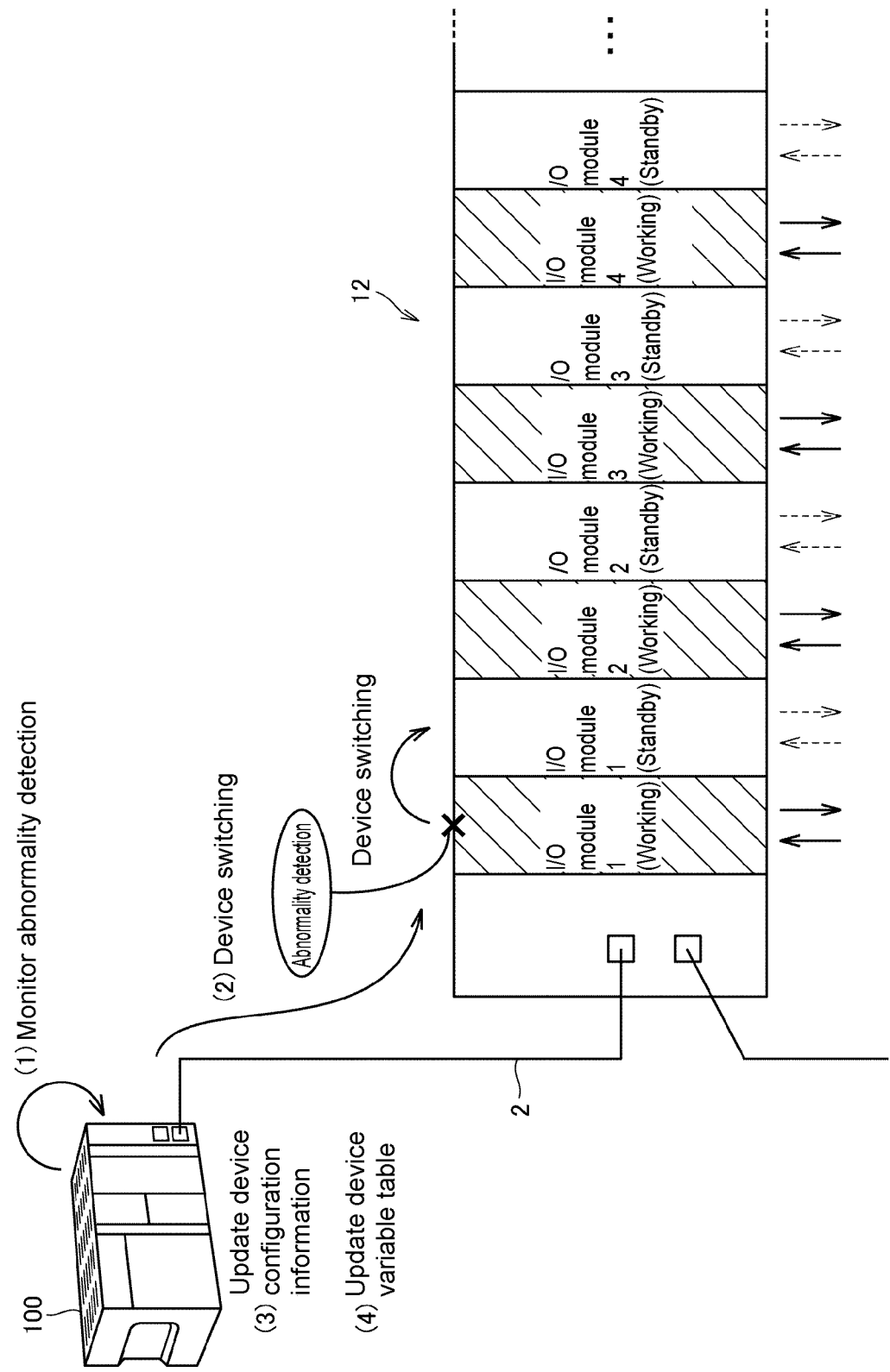
FIG. 4 is a schematic diagram illustrating an automatic device switching function provided by a control system according to one or more embodiments.

FIG. 4 is a schematic diagram describing the automatic device switching function provided by the control system 1 according to an embodiment. The control system 1 includes a controller 100 for controlling a control target and a redundant device accessible from the controller 100. In the example of FIG. 4, the remote I/O device 12, which is connected to the controller 100 with the first field network 2, includes a plurality of I/O modules that are redundant. In FIG. 4, each I/O module is a device.

Although the remote I/O device 12 separate from the controller 100 includes such redundant devices in the example shown in FIG. 4, the controller 100 may incorporate such redundant devices. In that configuration, the devices are the I/O modules or other modules connected to the computation unit of the controller 100 with a bus or other connection.

The controller 100 according to an embodiment includes an abnormality detection function for devices. When any abnormality is detected in a device, the controller 100 switches the device for a corresponding redundant device. In particular, the abnormality detection function according to an embodiment uses machine learning provided by the machine learning engine 140 included in the controller 100 to detect an abnormality or a sign of an abnormality possibly occurring in a device. The controller 100 uses the abnormality detection technique, thresholds, and other parameters defined appropriately, and switches devices in response to any sign of abnormality or a sign of a failure, in addition to when actually detecting an abnormality or a failure.

FIG. 4 shows one redundancy configuration for hot swapping including sets of two I/O modules. More specifically, one of the two I/O modules in each set functions as a working module, and the other functions as a standby module. Although the two I/O modules are both operating normally, the standby I/O module is masked from signals output to the controller and signals output to the field. Unmasking the module causes immediate switching from the standby I/O module to the working I/O module. In the state shown in FIG. 4, an abnormality has been detected in the first set of I/O modules, and the device has switched from the working I/O module to the standby I/O module.

The controller 100 according to an embodiment mainly performs the procedure including (1) monitoring for abnormality detection, (2) device switching, (3) updating device configuration information, and (4) updating a device variable table. This procedure is basically performed automatically without the device operating status being checked by maintenance personnel. The abnormality detection monitoring performed in an embodiment involves machine learning using feature quantities to increase detection accuracy.

D. Overall Functions of Control System

The overall functions of the control system 1 according to an embodiment will now be described.

Figure 5:
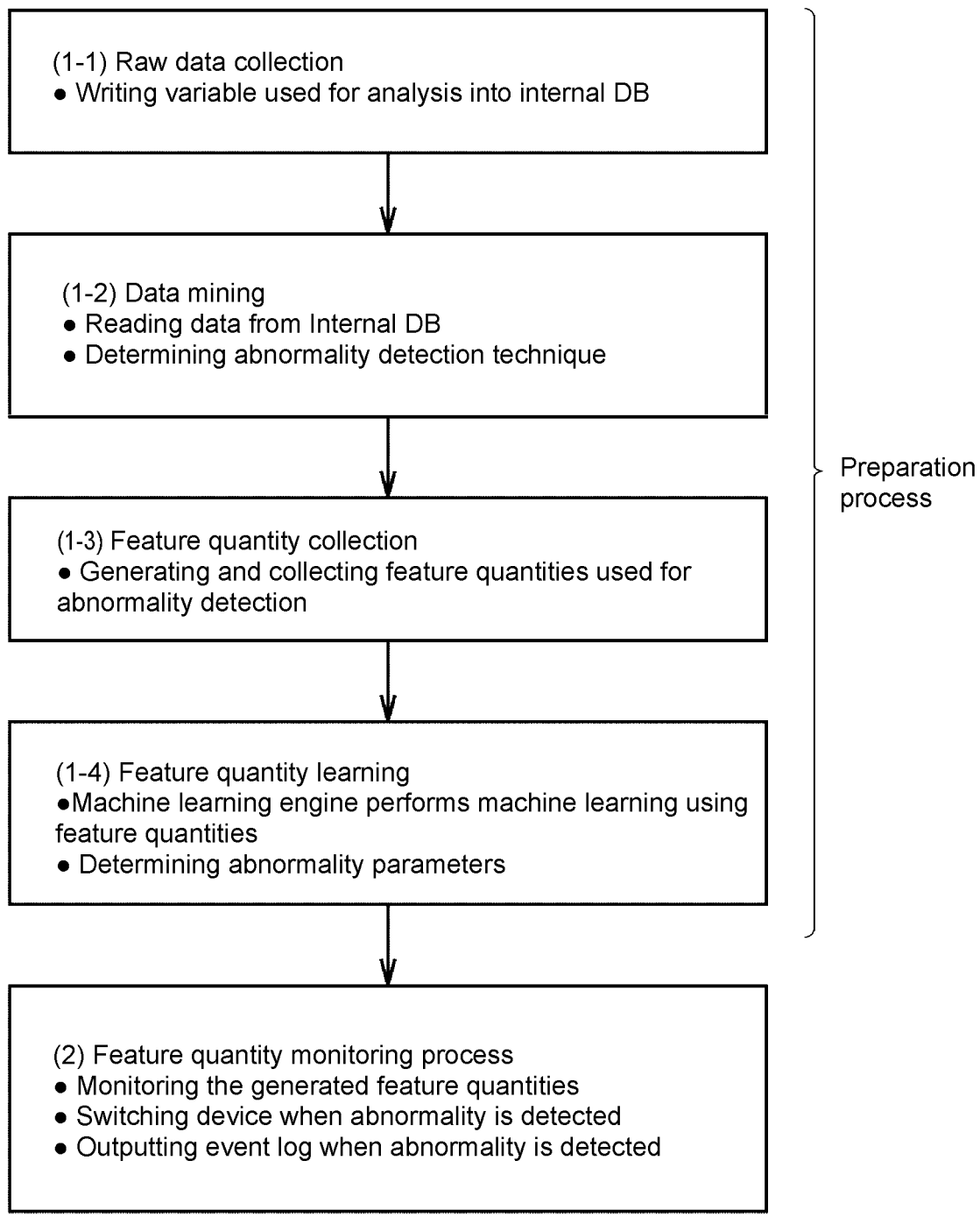
FIG. 5 is a schematic diagram illustrating the overall function of a control system according to one or more embodiments.

FIG. 5 is a schematic diagram describing the overall functions of the control system 1 according to an embodiment. The overall functions shown in FIG. 5 include a preparation process and a feature quantity monitoring process. The preparation process determines the abnormality detection technique and abnormality detection parameters to be used in the feature quantity monitoring process. The preparation process includes raw data collection (1-1), data mining (1-2), feature quantity collection (1-3), and feature quantity learning (1-4).

In the raw data collection (1-1), data to be used for abnormality detection analysis is selected from the data used by the controller 100 and is written into the internal DB 130. The raw data collection (1-1) is performed by executing an internal DB write program (described later) of the controller 100.

In the data mining (1-2), data written in the internal DB 130 is read, and the abnormality detection technique is determined. The abnormality detection technique indicates the type of data to be monitored and the logic to be used for monitoring the data to detect a target abnormality. In an embodiment, the abnormality detection technique includes feature quantity generation from one or more data items obtained from the field. The data mining (1-2) is typically implemented by executing the data mining tool 226 (described later) of the support apparatus 200. Depending on the determined abnormality detection technique, the settings and parameters for generating the feature quantities are output.

In the feature quantity collection (1-3), the feature quantity generating technique determined in the data mining (1-2) is used for the target data selected from the data transmitted and received to and from the field and from the internal data. The feature quantity generating technique is used to generate the feature quantities sequentially. The feature quantity collection (1-3) is performed by executing a feature quantity generation program (described later) in the controller 100.

In the feature quantity learning (1-4), the feature quantities collected in the feature quantity collection (1-3) undergo machine learning. Based on the results from machine learning, the abnormality detection parameters (typically, a threshold) to be used for abnormality detection are determined. The feature quantity learning (1-4) is provided by the machine learning engine (described later) included in the controller 100. As described above, the controller 100 performs machine learning using data associated with redundant devices to implement the learning function for determining abnormality detection parameters.

Through the processes (1-1) to (1-4) described above, the system can define the feature quantities used for abnormality detection, and can determine the abnormality detection parameters used for detecting an abnormality.

The preparation process shown in FIG. 5 may not be performed in the controller 100, but may be performed with the abnormality detection technique or abnormality detection parameters preliminary assigned to each device. For example, the manufacturer of each device may define the abnormality detection technique or the abnormality detection parameters based on the characteristic values and other information about the device.

The preparation process described above is followed by monitoring for an abnormality. More specifically, the feature quantity monitoring process (2) is performed. In the feature quantity monitoring process (2), the feature quantities generated in each predetermined cycle or for each predetermined event are monitored to determine whether the generated feature quantities meet the conditions defined based on the predetermined abnormality detection parameters. When an abnormality is detected, the device is switched in accordance with the detected abnormality, and an event log indicating the detected abnormality is output.

Figure 6:
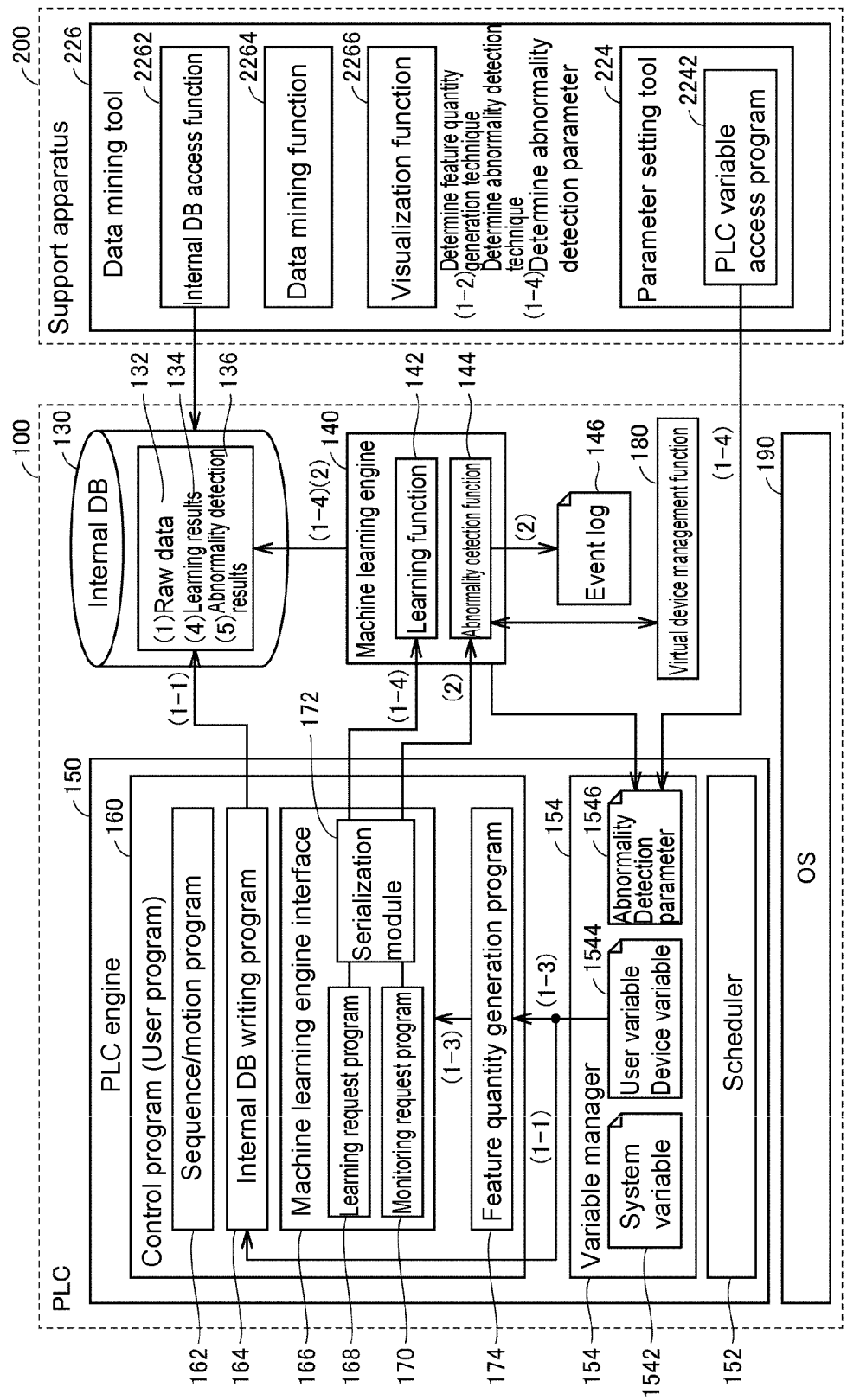
FIG. 6 is a schematic diagram illustrating the functions provided by the components of a control system according to one or more embodiments.

FIG. 6 is a schematic diagram describing the functions provided by the components of the control system 1 according to an embodiment. In the schematic diagram of FIG. 6, the numbers in parentheses indicate the processing in the corresponding processes (1-1) to (1-4) and (2) shown in FIG. 5.

The controller 100 includes a PLC engine 150 and a virtual device management function 180, in addition to the internal DB 130 and the machine learning engine 140. These functions are basically implemented by the processor 102 included in the controller 100 (FIG. 2) executing programs. The controller 100 incorporates an OS 190 installed to provide the environment for the processor 102 to execute the programs.

The PLC engine 150 is typically provided by system programs and user programs being executed on the OS 190. More specifically, one aspect may include programs executed on a computer to implement the controller 100 including the PLC engine 150 and the virtual device management functions 180.

More specifically, the PLC engine 150 includes a scheduler 152, a variable manager 154, and a control program 160.

The scheduler 152 controls the timing and the order of execution of each program (or the corresponding task) included in the PLC engine 150. Each task included in the PLC engine 150 has a predetermined execution cycle. The scheduler 152 provides control to allow repeated execution of the task in every predetermined execution cycle.

The variable manager 154 manages, as variables, data updated by I/O refresh, which is periodically performed in the PLC engine 150. More specifically, the variable manager 154 stores and manages system variables 1542 including a data set indicating the operation states of the components of the controller 100, user variable/device variables 1544 including a data set read and written by the user program executed in the PLC engine 150, and abnormality detection parameters 1546 used for abnormality detection.

The abnormality detection parameters 1546 can be accessed and updated by a PLC variable access program 2242 in the support apparatus 200. More specifically, the variable manager 154 stores the abnormality detection parameters 1546, and provides the function of updating the stored abnormality detection parameters 1546 in response to a request from an external device.

The control program 160 corresponds to a user program that can be freely created by a user, and typically includes a sequence/motion program 162, an internal DB write program 164, a machine learning engine interface 166, and a feature quantity generation program 174. The program instructions for the control program 160 may be written in an integrated program or in separate programs.

The sequence/motion program 162 includes logical operation instructions and/or arithmetic operation instructions for controlling a control target. The internal DB write program 164 writes a predetermined one of the variables included in the user variable/device variables 1544 into the internal DB 130.

The machine learning engine interface 166 includes instructions for operating the machine learning engine 140. More specifically, the machine learning engine interface 166 includes a learning request program 168, a monitoring request program 170, and a serialization module 172.

More specifically, the learning request program 168 includes instructions to cause the machine learning engine 140 to perform machine learning. The monitoring request program 170 includes instructions to cause the machine learning engine 140 to monitor a feature quantity using the abnormality detection parameters 1546 and detect an abnormality.

The serialization module 172 performs serialization to reduce the communication traffic between the machine learning engine 140 and the learning request program 168 and between the machine learning engine 140 and the monitoring request program 170. As described later, the serialization module 172 compresses data for the feature quantity generated by executing the feature quantity generation program 174 and provides the compressed data to a learning function 142 and an abnormality detection function 144.

The feature quantity generation program 174 includes instructions each for generating the feature quantity using specified variables from the user variable/device variables 1544 with the predetermined feature quantity generation technique. As describe later, an appropriate feature quantity generation technique is determined depending on a target redundant device. In particular, the feature quantity generation program 174 in the control system 1 according to an embodiment generates the feature quantity using the data associated with the redundant device.

The internal DB 130 typically stores raw data 132 collected in the raw data collection (1-1), learning results 134 obtained in the feature quantity learning (1-4), and abnormality detection results 136 output in the feature quantity monitoring process (2).

The machine learning engine 140 includes the learning function 142 for performing intended processing in the feature quantity learning (1-4) and the abnormality detection function 144 for performing intended processing in the feature quantity monitoring process (2). The learning function 142 performs machine learning using the feature quantity generated by executing the feature quantity generation program 174. The abnormality detection function 144 detects an abnormality in a redundant device based on the abnormality detection parameters 1546 and the feature quantities generated by executing the feature quantity generation program 174. The abnormality detection parameters 1546 are determined based on the learning results from machine learning implemented by the learning function 142 and used for detecting an abnormality in the redundant device. In this manner, the abnormality detection function 144 determines whether an abnormality has occurred in any redundant device based on the feature quantity generated by executing the feature quantity generation program 174 and the predetermined abnormality detection parameters 1546.

When detecting any abnormality, the abnormality detection function 144 transmits information about the detected abnormality to the virtual device management function 180, and outputs an event log 146 including the information about the detected abnormality. The controller 100 thus has the log output function of outputting the event log 146 when the abnormality detection function 144 determines that an abnormality has occurred. The event log 146 includes information about the abnormality that has been determined to occur. In place of or in addition to outputting the event log 146, the controller 100 may transmit an email or other message to a target user.

When any abnormality is detected, the virtual device management function 180 performs processing for switching a target device. More specifically, the virtual device management function 180 changes the operating modes of the devices in the target redundant device set, or specifically changes the operating mode of the working device to the standby mode and the operating mode of the standby device to the working mode. More specifically, when the abnormality detection function 144 determines that an abnormality has occurred, the virtual device management function 180 switches the redundant devices between the working mode and the standby mode. The device switching between the working mode and the standby mode may be implemented with a virtualization technique described later.

The support apparatus 200 includes the parameter setting tool 224 and the data mining tool 226 installed in addition to the development program 222 (FIG. 3).

The parameter setting tool 224 includes the PLC variable access program 2242 for enabling access to each variable managed by the variable manager 154 in the controller 100. The PLC variable access program 2242 enables reference to and rewriting of variables in the controller 100.

The data mining tool 226 includes an internal DB access function 2262, a data mining function 2264, and a visualization function 2266. The internal DB access function 2262 accesses the internal DB 130 to extract intended data from the raw data collected in the internal DB 130. The data mining function 2264 mainly performs the data mining (1-2) described above. The visualization function 2266 visually presents various items of information that may be obtained in the data mining (1-2) and the information about the abnormality detected in the feature quantity monitoring process (2) to the user.

The data mining tool 226 determines the feature quantity generation technique and the abnormality detection technique in the data mining (1-2), and determines the abnormality detection parameter in the feature quantity learning (1-4).

E. Preparation Process

The feature quantity generation technique and the abnormality detection technique determined in the preparation process in one example will now be described.

FIG. 7 is a table listing the feature quantities that can be determined in the preparation process performed in the control system 1 according to an embodiment. The feature quantities shown in FIG. 7 are predefined. The preparation process includes the raw data collection (1-1) in which raw data is collected into the internal DB 130, and the data mining (1-2) in which the feature quantities to be used are determined.

More specifically, each feature quantity shown in FIG. 7 is calculated using the raw data collected in the internal DB 130, and the feature quantities having higher degrees of change are determined as candidates. In some embodiments, typical techniques to be used include various principal component analyses. A known method of principal component analysis may be used.

The control system 1 according to an embodiment has a plurality of techniques prepared for generating the feature quantities shown in FIG. 7. At least one of these techniques may be used selectively.

The feature quantities are collected in the feature quantity collection (1-3) with the selected feature quantity generation technique. Based on the collected feature quantities, the abnormality detection parameter corresponding to the abnormality detection technique is determined in the feature quantity learning (1-4).

FIG. 8 is a schematic diagram showing example abnormality detection techniques or example abnormality detection parameters determined in the preparation process performed by the control system 1 according to an embodiment. FIG. 8 is an abnormality detecting defining table 1421 storing, in an associated manner, a device type 1422 indicating the type of a device for which an abnormality is to be detected, a feature quantity generation technique 1423 for generating the feature quantity of the corresponding device, and an abnormality detection technique 1424 corresponding to the feature quantity generation technique.

In the example shown in FIG. 8, the digital I/O unit uses the amplitude change of a digital I/O signal of each channel as its feature quantity, and uses the upper and lower limits for the amplitude change as its abnormality detection technique. The feature quantity generation technique and the abnormality detection technique are determined in the same manner for the other devices.

Although the single feature quantity generation technique and the single abnormality detection technique are assigned to each device of the same type in the example shown in FIG. 8, a plurality of feature quantity generation techniques and the corresponding abnormality detection techniques may be assigned to each device of the same type. For the same type of devices with different model numbers or different product numbers, different feature quantity generation techniques and the corresponding abnormality detection techniques may be assigned to each model number or each product number. For the same type of devices with different channels, different feature quantity generation techniques and the corresponding abnormality detection techniques may be assigned to each channel.

For the same type of devices with, for example, different product numbers, different feature quantity generation techniques and the corresponding abnormality detection techniques may be assigned to each product number.

In the example shown in FIG. 8, the abnormality detecting defining table 1421 includes the feature quantity generation technique 1423 and the abnormality detection technique 1424. The table may further include an abnormality detection parameter (e.g., an abnormality detecting threshold) used by the abnormality detection technique 1424. In this case, the table includes, for example, the values to be used in correspondence with the type of values defined for each of the abnormality detection techniques 1424 (e.g., the upper limit).

In an embodiment, the virtual device management function 180 manages the abnormality detection parameters.

F. Feature Quantity Monitoring Process

Figure 9:
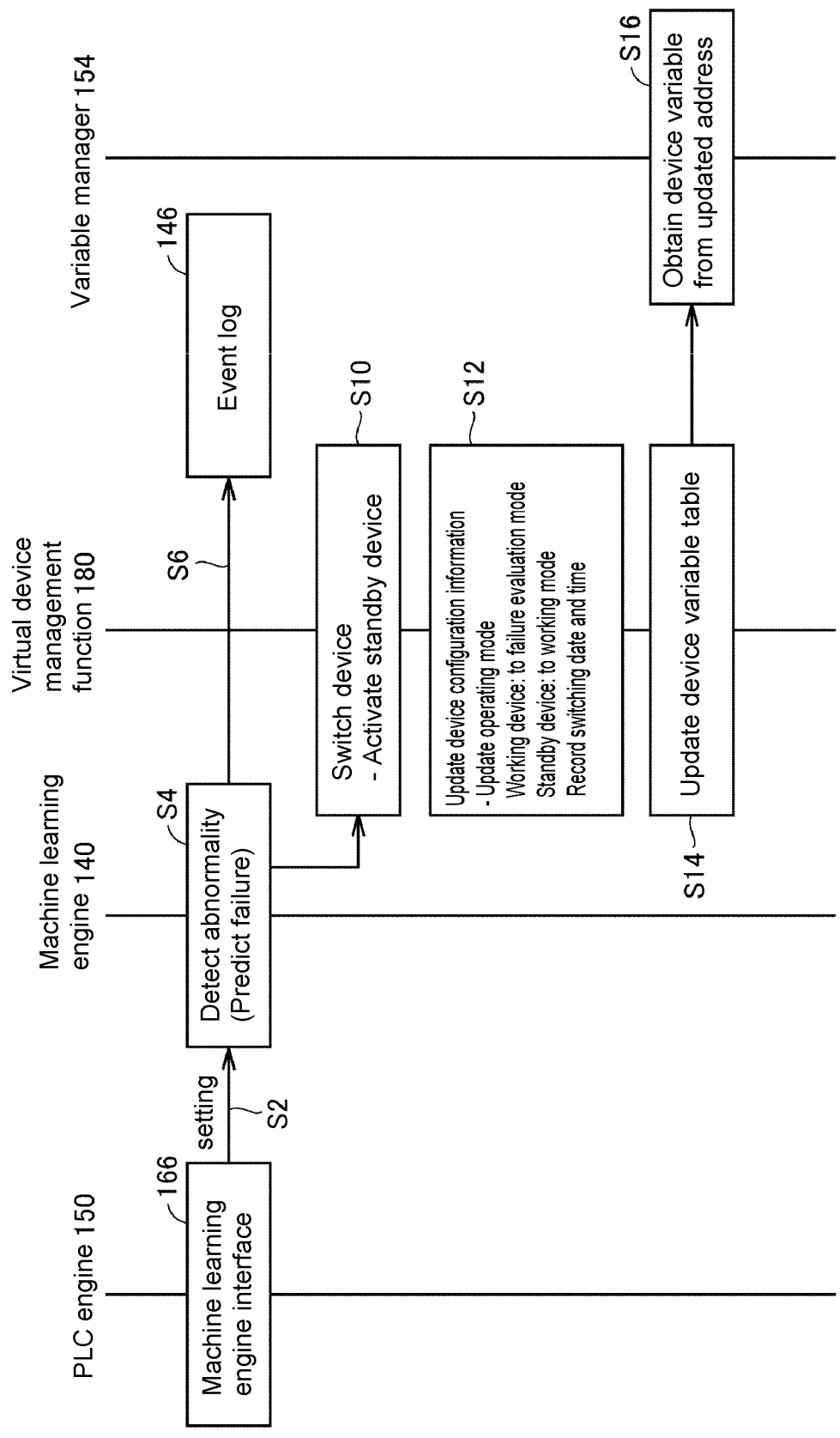
FIG. 9 is a schematic diagram illustrating the details of a feature quantity monitoring process performed in a control system according to one or more embodiments.

The feature quantity monitoring process will now be described with reference to the operation of each component shown in FIG. 6. FIG. 9 is a schematic diagram describing the feature quantity monitoring process performed in the control system 1 according to an embodiment.

Referring now to FIG. 9, the user uses the development program 222 provided by the support device 200 to create a user program for monitoring for any abnormality. The created user program includes instructions corresponding to the machine learning engine interface 166. The user program is executed to provide the settings from the machine learning engine interface 166 to the machine learning engine 140 (step S2).

The abnormality detection function 144 of the machine learning engine 140 performs an abnormality detection process (step S4). The abnormality detection process uses the feature quantity generated by the feature quantity generation program 174. When detecting any abnormality, the machine learning engine 140 outputs the event log 146 including information about the detected abnormality (step S6). Automatic device switching is also performed (steps S10 to S16).

The machine learning engine 140 can detect an abnormality of different context depending on the set abnormality detection parameter (typically, a threshold). For a threshold for determining a deteriorating state as a sign of a device failure, detecting an abnormality equates to predicting a failure in a target device. For a threshold for determining an actual device failure, detecting an abnormality equates to detecting a failure of a target device.

As described above, the abnormality detection parameter may be determined in accordance with the feature quantity obtained as a sign of a failure in a redundant device, or may be determined in accordance with the feature quantity obtained during a failure of a redundant device.

In automatic device switching, the virtual device management function 180 switches a target device between the working mode and the standby mode. More specifically, the virtual device management function 180 activates the target standby device (step S10). When the abnormality detection function 144 detects an abnormality, the virtual device management function 180 instructs the working device in the redundant device set to switch to the standby device, and instructs the standby device to switch to the working device.

Subsequently, the device configuration information (described in detail later) is updated. More specifically, the virtual device management function 180 updates the operating mode of the target device included in the device configuration information, and records the date and time on which the device switching occurs (step S12). The virtual device management function 180 further updates the items in the device variable table (described in detail later) (step S14), and updates the device information to the information about the device newly switched to the working mode. When the device variable table is updated, the variable manager 154 obtains a device variable from the updated address (or the address of the device newly switched to the working mode) (step S16). The resultant device variable to be referred to in executing the user program thus reflects the data about the device after switching.

G. Virtual Device Management Mechanism

The functions and the processing associated with the virtual device management function 180 will now be described.

Figure 10:
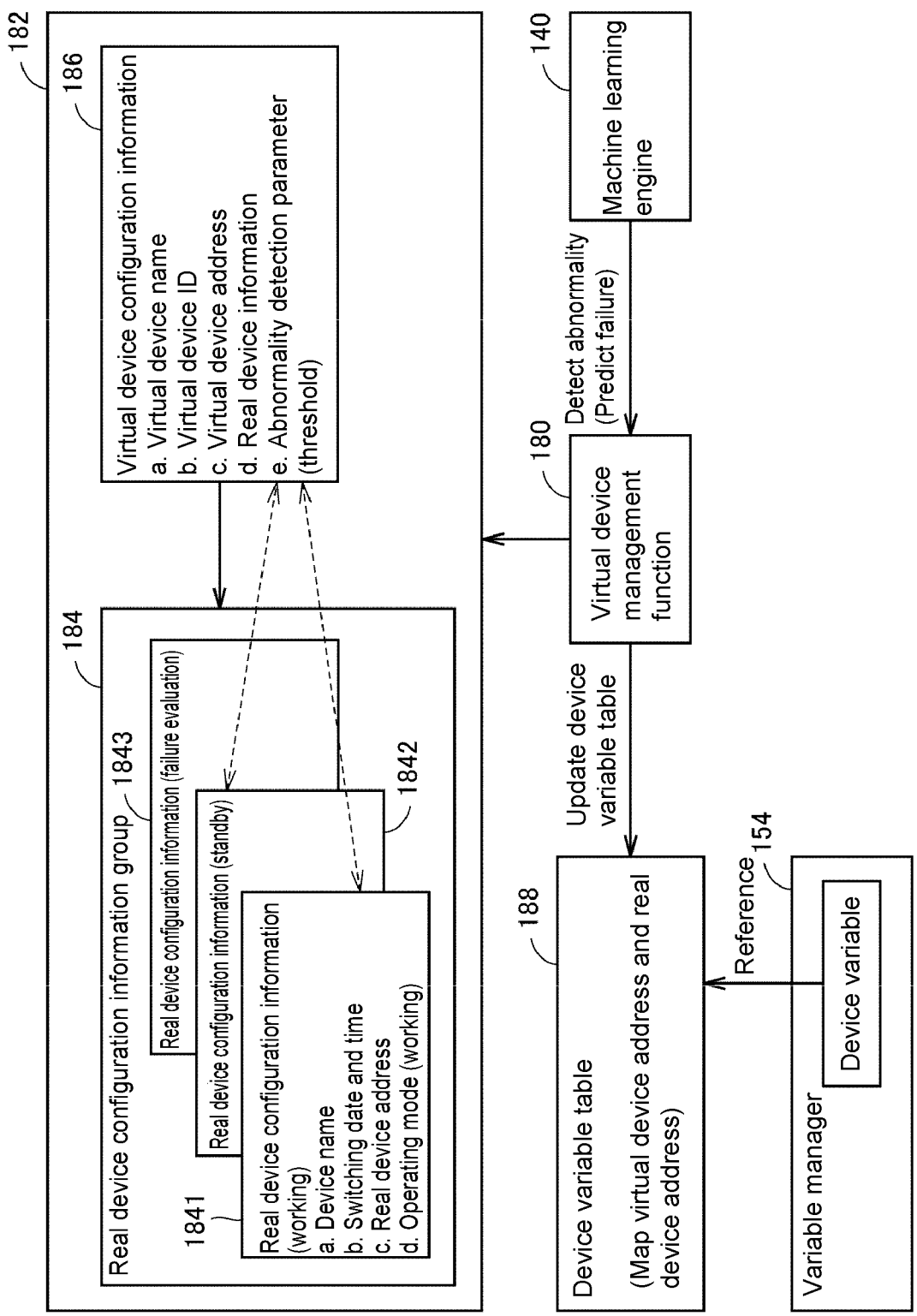
FIG. 10 is a schematic diagram illustrating the functions and processing associated with the virtual device management function included in a control system according to one or more embodiments.

FIG. 10 is a schematic diagram describing the functions and processing associated with the virtual device management function 180 included in the control system 1 according to an embodiment. Referring now to FIG. 10, the virtual device management function 180 starts device switching in response to an event of abnormality detection (or failure prediction) provided from the machine learning engine 140.

The control system 1 according to an embodiment uses a virtualization technique and indirectly associates an actually connected device with an access target. This eases the device switching.

More specifically, the virtual device management function 180 can access device configuration information 182. The device configuration information 182 is also accessible from the variable manager 154. The device configuration information 182 is stored in, for example, the secondary storage 108.

The device configuration information 182 includes a real device configuration information group 184 and virtual device configuration information 186.

For example, the real device configuration information group 184 is created and managed for a plurality of devices with redundancy. More specifically, the real device configuration information group 184 includes real device configuration information indicating the real configuration of each of the redundant devices. For example, when two devices are redundant, real device configuration information 1841 is created for a first device, and real device configuration information 1842 is created for a second device. At one point of time, the first device may function as the working device and the second device may function as the standby device, or conversely the second device may function as the working device and the first device may function as the standby device.

The real device configuration information 1841 and the real device configuration information 1842 each include values indicating a device name (a), a switching date and time (b), a real device address (c), and an operating mode (d). The device name (a) stores, for example, the product name of the corresponding device or the name defined by the user. The switching date and time (b) stores the date and time on which the operating mode was switched from the working mode to the standby mode or from the standby mode to the working mode. The real device address (c) stores the address corresponding to the address at which the device is actually located. The address stored in the real device address (c) can be used to access the corresponding device.

The operating mode (d) indicates whether the corresponding device is currently functioning as the working device or as the standby device. The operating mode may include a failure verification mode to determine the accuracy of the detected abnormality, in addition to the working mode and the standby mode.

When the operating mode (d) includes the failure verification mode, real device configuration information 1843 for storing the results from the failure verification mode may be prepared. The real device configuration information 1843 may include the feature quantity obtained upon detection of an abnormality and the corresponding abnormality detection parameter (e.g., a threshold).

The virtual device configuration information 186 contains information for identifying a device to be actually accessed from the variable manager 154. The virtual device configuration information 186 indicates the configuration containing virtualized redundant devices. The virtual device management function 180 updates the items of the virtual device configuration information 186 in a timely manner to allow the device switching. More specifically, the virtual device management function 180 includes information about the device to newly function as a working device.

More specifically, the virtual device configuration information 186 includes values indicating a virtual device name (a), a virtual device ID (b), a virtual device address (c), real device information (d), and an abnormality detection parameter (e). The virtual device name (a) stores, for example, the product name for identifying a redundant device or the name defined by the user. The virtual device ID (b) stores the ID for identifying a redundant device. The virtual device address (c) stores the address indicating a redundant device. For any device selected as a working device, the variable manager 154 refers to the ID stored in the virtual device ID (b) and the address stored in the virtual device address (c) to obtain an intended variable and update the device variable, or update the value for the device to the value stored in the device variable.

The real device information (d) stores information for identifying the relationship between a virtual device and a real device. The real device information (d) stores, for example, a device name and a real device address as information for identifying the device currently functioning as a working device. The real device information (d) is updated when the virtual device management function 180 performs device switching. More specifically, when the abnormality detection function 144 detects an abnormality, the virtual device management function 180 updates the real device information (d), or specifically information about the device to newly function as a working device, which is included in the virtual device configuration information 186.

The abnormality detecting parameter (e) is a parameter for detecting an abnormality in a target device, and is for example a threshold. The threshold may be a value indicating an actual failure state of the corresponding device or a value indicating the state of the corresponding device immediately before the device fails. In the preparation process described above, a feature quantity that changes greatly immediately before the device fails is extracted to set, for example, a threshold corresponding to the state of the device about 10 days before the failure. In this manner, the feature quantity generation technique and the corresponding failure detecting parameter may be optimized to perform failure prediction, or to perform abnormality detection before the date on which a failure is expected.

The feature quantity generation technique and the failure detecting parameter described above may be designed as appropriate depending on the significance of a target control system.

The virtual device management function 180 updates a device variable table 188, in addition to the device configuration information 182, in response to an event of abnormality detection (or failure prediction) provided from the machine learning engine 140. The device variable table 188 maps a virtual device address and a real device address (the address of the device currently functioning as a working device). The device variable table 188 is updated in accordance with the updated device configuration information 182. More specifically, when the abnormality detection function 144 detects an abnormality, the virtual device management function 180 associates the virtual device address in the device variable table 188 with the address of the device to newly function as a working device.

The variable manager 154 refers to the device variable table 188 to transmit and receive data to and from a target one of the redundant devices. When the device configuration information 182 is updated, the variable manager 154 reads intended information from the working device or writes information instructed to the working device (or performs I/O refresh) based on the address indicated by the updated device configuration information 182 to update the device variable 1544.

The functions and the processing described above enable automatic switching between devices when any abnormality occurs in one device.

H. User Program

An example user program for implementing the automatic switching function according to an embodiment will now be described.

Figure 11:
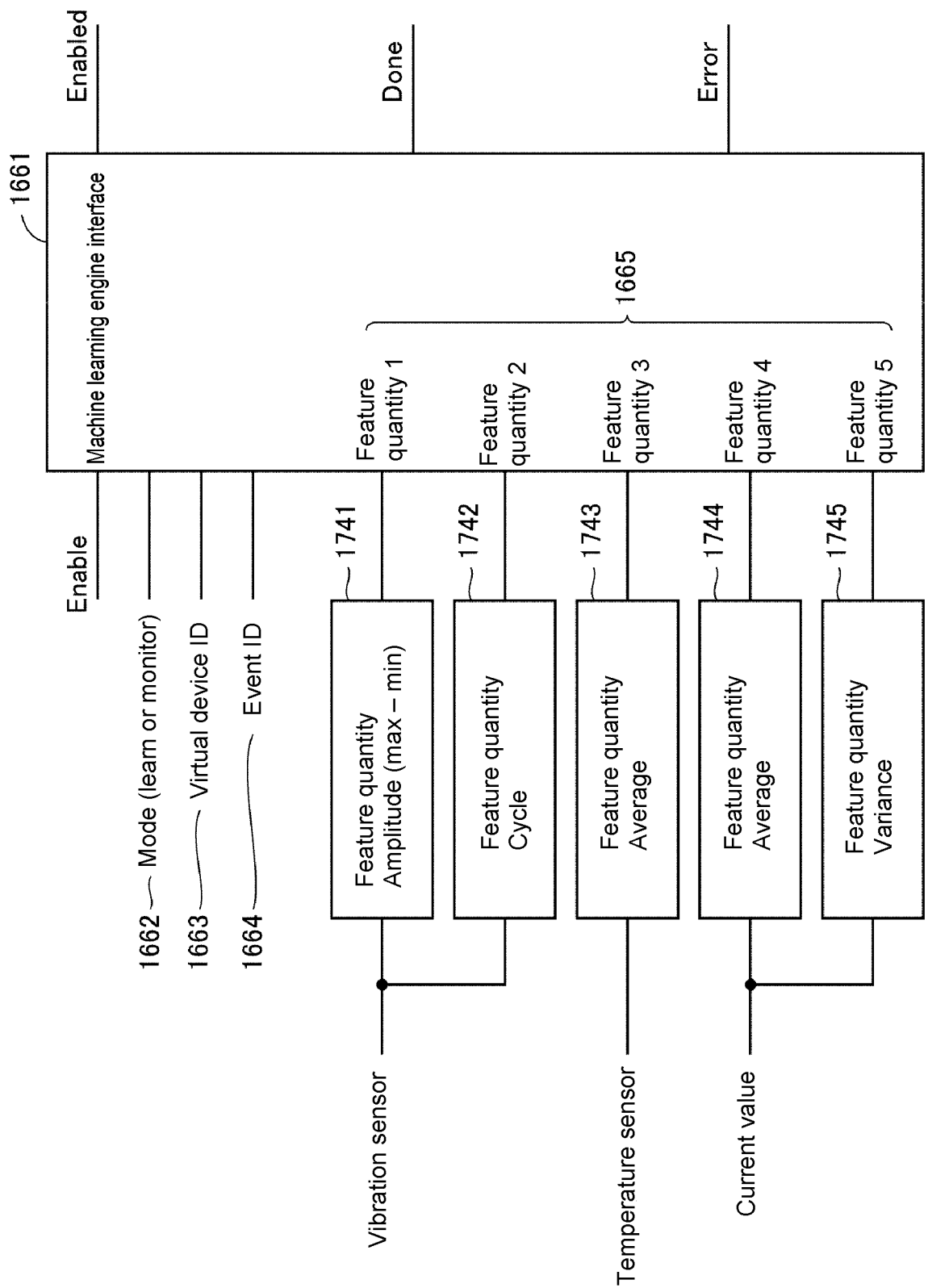
FIG. 11 is a diagram illustrating an example user program having the automatic switching function implemented in a control system according to one or more embodiments.

FIG. 11 is a diagram showing an example user program having the automatic switching function implemented in the control system 1 according to an embodiment. Referring to FIG. 11, the automatic switching function according to an embodiment is implemented as a function block 1661 that functions as the machine learning engine interface 166 (FIG. 6).

The function block 1661 stores settings that cause the machine learning engine 140 (FIG. 6) to function selectively. More specifically, a mode setting 1662 stores either a learning mode or a monitoring mode. The learning mode enables the learning function 142 in the machine learning engine 140 to perform machine learning used in the preparation process (FIG. 5). The monitoring mode enables the abnormality detection function 144 in the machine learning engine 140 to perform the feature quantity monitoring (FIG. 5).

A virtual device ID setting 1663 stores a virtual device ID of a device to which automatic switching is performed when the abnormality detection function 144 in the machine learning engine 140 detects an abnormality. More specifically, when any abnormality is detected, the virtual device management function 180 automatically switches the device to the device with the virtual device ID stored in the virtual device ID setting 1663.

An event ID setting 1664 stores an event ID generated when the abnormality detection function 144 in the machine learning engine 140 detects an abnormality. When detecting an abnormality, the machine learning engine 140 outputs an event with the ID stored in the event ID setting 1664 and registers the event into the event log 146.

The function block 1661 can receive input of one or more feature quantities (feature quantity setting 1665). The feature quantity setting 1665 can store any input feature quantity. In the example shown in FIG. 11, five feature quantity generation function blocks 1741 to 1745 are defined. The function block 1661 receives input of the feature quantities generated in these function blocks. More specifically, the feature quantity generation program 174 is associated with the machine learning engine 140 based on the information stored in the feature quantity setting 1665.

The feature quantity generation function blocks 1741 to 1745 may be selected freely. Typically, any function block may be selected as the functional block for calculating the determined feature quantity in the preceding data mining.

The user may simply define the function block 1661 in the user program to implement the automatic device switching function according to an embodiment. Without knowledge about preventive maintenance (PM), the user can use the automatic switching function of switching the target device with any sign of deterioration to an alternative device.

I. Modifications

All or some of the functions of the support apparatus 200 described above may be incorporated in the controller 100. For example, the data mining tool 226 implemented in the support apparatus 200 may be implemented in the controller 100. This configuration allows the functions according to an embodiment to be used without many application programs installed in the support apparatus 200.

In addition, the module configurations shown in FIG. 6 are mere examples, and may have any configurations that can provide the functions described above. For example, a single functional module shown in FIG. 6 may be implemented as a set of multiple functional modules, or multiple functional modules shown in FIG. 6 may be implemented as a single module depending on the limitations on hardware or programming.

J. Advantages

The control system according to an embodiment allows determination of the deterioration degree in a device and prediction of the time at which the device fails due to the deterioration by monitoring an abnormality based on the feature quantities generated from the data obtained by devices, such as sensors and units, and on the abnormality detection parameters obtained by the machine learning using the data. The control system uses abnormality detection parameters defined appropriately, and switches the operation mode of the standby device to the working mode to prevent equipment stops caused by failures before any fatal failure occurs in the redundant devices.

Although PM involves daily monitoring of operations for signs of failure and uses maintenance costs for maintenance planning and implementations, the automatic device switching function according to an embodiment reduces such additional maintenance costs.

A device determined to have an abnormality may be inspected and the inspection results may be fed back. Such feedback information can be used to increase the accuracy of failure prediction and to optimize the redundancy for each control target.

The embodiments disclosed herein are only illustrative in all respects and should not be construed to be restrictive. The scope of the present invention is determined not by the description given above but by the claims, and is construed as including any modification that comes within the meaning and range of equivalency of the claims.

REFERENCE SIGNS LIST 1 control system
2 first field network
4 second field network
6 local network
10 field device group
12 remote I/O device
14 relay group
16, 124 I/O unit
18 image sensor
20 camera
22 servo driver
24 servo motor
100 controller
102, 202 processor
104 chipset
106, 206 main storage
108, 208 secondary storage
110, 214 local network controller
112, 212 controller
114 memory card interface
116 memory card
118, 120 fieldbus controller
122 internal bus controller
130 internal DB
132 raw data
134 learning results
136 abnormality detection results
140 machine learning engine
142 learning function
144 abnormality detection function
146 event log
150 PLC engine
152 scheduler
154 variable manager
160 control program
162 motion program
164 write program
166 machine learning engine interface
168 learning request program
170 monitoring request program
172 serialization module
174 feature quantity generation program
180 virtual device management function
182 device configuration information
184 real device configuration information group
186 virtual device configuration information
188 device variable table
190 OS
200 support apparatus
204 optical drive
205 recording medium
216 input unit
218 display unit
220 bus
222 development program
224 parameter setting tool
226 data mining tool
300 data logging device
400 display
1421 abnormality detecting defining table
1422 type
1423 feature quantity generation technique
1424 abnormality detection technique
1542 system variable
1544 device variable
1546 abnormality detection parameter
1661 function block
1662 mode setting
1663, 1664 setting 1665 feature quantity setting
1741, 1745 feature quantity generation function block
1841, 1842, 1843 real device configuration information
2242 variable access program
2262 access function
2264 data mining function
2266 visualization function

The invention claimed is:

1. A control system including a controller for controlling a control target and redundant devices accessible from the controller, the control system comprising a processor configured with a program to perform operations comprising:
   operation as a feature quantity generation unit configured to generate a feature quantity from data associated with the redundant devices;
   operation as an abnormality detection unit configured to determine whether an abnormality has occurred in one of the redundant devices based on the feature quantity generated by the feature quantity generation unit and a predetermined abnormality detection parameter;
   operation as a switch unit configured to switch the redundant devices between a working mode and a standby mode in response to the abnormality detection unit determining that the abnormality has occurred; and
   operation as a learning unit configured to perform machine learning using the data associated with the redundant devices to determine the abnormality detection parameter.

2. The control system according to claim 1, wherein the processor is configured with the program such that operation as the switch unit comprises operation as the switch unit comprising:
   a storage unit configured to store: real device configuration information indicating a real configuration of each of the redundant devices; and virtual device configuration information indicating a virtualized configuration of each of the redundant devices, the virtual device configuration information comprising information about a device to newly function as a working device; and
   an update unit configured to update the information about the device to newly function as the working device contained in the virtual device configuration information in response to the abnormality detection unit determining that the abnormality has occurred.

3. The control system according to claim 2, wherein the processor is configured with the program to perform operations further comprising:
   operation as a variable manager configured to transmit and receive data to and from a target device by referring to a virtual device address,
   wherein the processor is configured with the program such that operation as the switch unit comprises operation as the switch unit associates the virtual device address with an address of the target device to newly function as a working device in response to the abnormality detection unit determining that the abnormality has occurred.

4. The control system according to claim 3, wherein the processor is configured with the program such that operation as the switch unit comprises operation as the switch unit that instructs one of the redundant devices functioning as a working device to switch to a standby device, and instructs one of the redundant devices functioning as a standby device to switch to a working device in response to the abnormality detection unit determining that the abnormality has occurred.

5. The control system according to claim 2, wherein the processor is configured with the program such that operation as the switch unit comprises operation as the switch unit that instructs one of the redundant devices functioning as a working device to switch to a standby device, and instructs one of the redundant devices functioning as a standby device to switch to a working device in response to the abnormality detection unit determining that the abnormality has occurred.

6. The control system according to claim 1, wherein the processor is configured with the program to perform operations further comprising:
   operation as a variable manager configured to transmit and receive data to and from a target device by referring to a virtual device address,
   wherein the processor is configured with the program such that operation as the switch unit comprises operation as the switch unit associates the virtual device address with an address of the target device to newly function as a working device in response to the abnormality detection unit determining that the abnormality has occurred.

7. The control system according to claim 6, wherein the processor is configured with the program such that operation as the switch unit comprises operation as the switch unit that instructs one of the redundant devices functioning as a working device to switch to a standby device, and instructs one of the redundant devices functioning as a standby device to switch to a working device in response to the abnormality detection unit determining that the abnormality has occurred.

8. The control system according to claim 1, wherein the processor is configured with the program such that operation as the switch unit comprises operation as the switch unit that instructs one of the redundant devices functioning as a working device to switch to a standby device, and instructs one of the redundant devices functioning as a standby device to switch to a working device in response to the abnormality detection unit determining that the abnormality has occurred.

9. The control system according to claim 1, wherein the processor is configured with the program such that the abnormality detection parameter is determined in accordance with a feature quantity that is a sign of a failure in one of the redundant devices.

10. The control system according to claim 1, wherein the processor is configured with the program to perform operations further comprising:
    operation as a log output unit configured to output, in response to the abnormality detection unit determining that the abnormality has occurred, an event log comprising information about the abnormality.

11. The control system according to claim 1, wherein the processor is configured with the program such that operation as the feature quantity generation unit comprises operation as the feature quantity generation unit that selects at least one of a plurality of predefined techniques for generating the feature quantity.

12. The control system according to claim 1, wherein the processor is configured with the program such that the redundant devices each comprise at least of: a digital input/output unit; an analog input/output unit; a servo driver; an inverter unit; an image sensor; a displacement sensor; and a fiber sensor.

13. A non-transitory computer-readable storage medium storing a control program executable by a computer to implement a controller for controlling a control target, the program causing the computer to perform operations comprising:

generating a feature quantity from data associated with redundant devices accessible from the controller;

determining whether an abnormality has occurred in one of the redundant devices based on the generated feature quantity and a predetermined abnormality detection parameter;

switching the redundant devices between a working mode and a standby mode in response to the abnormality being determined to have occurred; and performing machine learning using the data associated with the redundant devices to determine the abnormality detection parameter.

14. A control method used by a controller for controlling a control target, the method comprising:

generating a feature quantity from data associated with redundant devices accessible from the controller;

determining whether an abnormality has occurred in one of the redundant devices based on the generated feature quantity and a predetermined abnormality detection parameter;

switching the redundant devices between a working mode and a standby mode in response to the abnormality being determined to have occurred; and performing machine learning using the data associated with the redundant devices to determine the abnormality detection parameter.

15. The control method according to claim 14, further comprising:

storing real device configuration information indicating a real configuration of each of the redundant devices;

storing virtual device configuration information indicating a virtualized configuration of each of the redundant devices, the virtual device configuration information comprising information about a device to newly function as a working device; and updating the information about the device to newly function as the working device contained in the virtual device configuration information in response to determining that the abnormality has occurred.

16. The control method according to claim 14, further comprising:

transmitting and receiving data to and from a target device by referring to a virtual device address; and associating the virtual device address with an address of a device to newly function as a working device in response to determining that the abnormality has occurred.

17. The control method according to claim 14, further comprising:

instructing one of the redundant devices functioning as a working device to switch to a standby device; and instructing one of the redundant devices functioning as a standby device to switch to a working device in response to determining that the abnormality has occurred.

18. The control method according to claim 14, wherein performing machine learning using the data associated with the redundant devices to determine the abnormality detection parameter comprises performing machine learning using the data associated with the redundant devices to determine the abnormality detection parameter in accordance with a feature quantity that is a sign of a failure in one of the redundant devices.

19. The control method according to claim 14, further comprising outputting, in response to determining that the abnormality has occurred, an event log comprising information about the abnormality.

20. The control method according to claim 14, further comprising selecting at least one of a plurality of predefined techniques for generating the feature quantity.

\* \* \* \* \*